United States Patent
Badt et al.

(10) Patent No.: US 6,542,868 B1
(45) Date of Patent: Apr. 1, 2003

(54) AUDIO NOTIFICATION MANAGEMENT SYSTEM

(75) Inventors: Daniel E. Badt, Atlantis, FL (US); Peter J. Guasti, Coral Springs, FL (US); Gary R. Hanson, Palm Beach Gardens, FL (US); Amado Nassiff, Boynton Beach, FL (US); Edwin A. Rodriguez, Juno Beach, FL (US); Harvey Ruback, Loxahatchee, FL (US); Carl A. Smith, Boca Raton, FL (US); Ronald E. Vanbuskirk, Indiantown, FL (US); Huifang Wang, Boynton Beach, FL (US); Steven G. Woodward, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,678

(22) Filed: Sep. 23, 1999

(51) Int. Cl.[7] .......................... G10L 21/00; G06F 15/16
(52) U.S. Cl. ................. 704/270; 704/274; 709/207
(58) Field of Search ................ 704/201, 258, 704/251, 3, 207, 250, 233; 340/7.39, 286.11, 521

(56) References Cited

U.S. PATENT DOCUMENTS

| | | | | |
|---|---|---|---|---|
| 4,276,572 A | * | 6/1981 | Hayashi et al. | 360/12 |
| 4,630,261 A | * | 12/1986 | Irvin | 340/825.5 |
| 5,216,675 A | * | 6/1993 | Melliar-Smith et al. | 370/400 |
| 5,632,002 A | * | 5/1997 | Hashimoto et al. | 704/231 |
| 5,644,629 A | * | 7/1997 | Chow | 379/142.05 |
| 5,684,862 A | * | 11/1997 | Finnigan | 379/207.03 |
| 5,732,216 A | * | 3/1998 | Logan et al. | 704/201 |
| 6,182,120 B1 | * | 1/2001 | Beaulieu et al. | 709/103 |
| 6,263,066 B1 | * | 7/2001 | Shtivelman et al. | 379/10.01 |
| 6,334,140 B1 | * | 12/2001 | Kawamata | 707/500 |
| 6,354,748 B1 | * | 3/2002 | Vrvilo | 709/204 |

FOREIGN PATENT DOCUMENTS

JP          60003741     *  1/1985  ............. G06F/3/16

* cited by examiner

Primary Examiner—Marsha D. Banks-Harold
Assistant Examiner—V. Paul Harper
(74) Attorney, Agent, or Firm—Akerman Senterfitt (57) ABSTRACT

A computer system has a notification manager for playing a message to a user by selecting one of a plurality of audio notifications. The method includes the step of setting a priority level for each notification arriving into a queue. The notification is inserted into a position in the queue based upon the priority level of the notification, such that the audio notifications at the queue top have a generally higher priority than audio notifications at the queue bottom. The notification at the top of the queue can be selected if the priority level of the notification is greater than a predetermined gate level. Once a notification is selected, a message corresponding to the selected notification is played to the user.

9 Claims, 6 Drawing Sheets

AUDIO NOTIFICATION MANAGEMENT SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer audio interfaces, and more particularly to a notification management system for an audio-only interface having a plurality of notifications.

2. Description of the Related Art

A computer audio interface allows a user to interact with a computer application through a speaker and a microphone. The interface plays audio messages to a user through the speakers, and receives audio input from a user, such as responses to audio queries generated by the interface, through the microphone. The messages are associated with notifications to the interface from an external source which alerts the interface to the existence of the message, and can be a predefined script spawned by a particular event, or an original message, such as an e-mail, input by a third person. The notification can be the message itself, a control signal, and the like which indicates the existence of a message for playing to the user.

Audio-only interfaces are useful in situations in which other types of interfaces, such as a keyboard, mouse, video display, and the like, are impractical or inconvenient. Typical uses for an audio-only interface include interfacing with computer applications that monitor and control equipment, such as automobiles, airplanes, or building systems. The interface can provide messages concerning the equipment while the user is performing tasks associated with the equipment.

Many computer applications can generate several audio notifications simultaneously. For example, in a car, a user can run low on gas, have to make a turn, have an incoming call, and have an incoming weather alert all at the same time. All of these events can spawn a notification to the vehicle driver by the car computer. However, the messages corresponding to the notifications cannot be played all at once.

A typical audio-only interface has a simple queuing system which plays each message in the order the message notification is received, or immediately upon receipt of the notification resulting in playing messages simultaneously. This type of interface can result in important messages being delayed beyond the point of usefulness, for example, a message that the car is low on gas is useless after the engine has stopped, or the message is unintelligible with the same result.

SUMMARY OF THE INVENTION

The invention provides a method of playing messages to a user by selecting one of a plurality of notifications. The method includes the step of setting a priority level for each notification arriving into a queue. The notification is inserted into a position in the queue based upon the priority level of the notification, such that the notifications proximal the queue top have a higher priority than audio notifications proximal the queue bottom. The notification at the queue top is selected for processing. Once a notification is selected, the message corresponding to the selected notification is played to the user.

In another aspect of the invention, the system notifies the user of the selected notification prior to playing the message corresponding to the selected notification. The system can then play the notification message, or query the user whether to play the notification message.

In yet another aspect of the present invention, the system assigns a new priority to a notification in the queue in response to an input. The system then relocates the notification to a new position in the queue corresponding to the new priority level that has been assigned to the notification.

According to yet another aspect, the invention may be embodied in a computer system having an audio-only interface adapted for selecting one of a plurality of notifications for playing to a user. In that case, the system includes application programming for setting a priority level of a notification arriving into a queue; inserting the notification into a position in the queue based upon the priority level of the notification, wherein notifications at a queue top have a higher priority than notifications at a queue bottom; selecting a notification at the queue top; and playing a message corresponding to the selected notification to the user.

Finally, the invention may take the form of a machine readable storage having stored thereon a computer program having a plurality of code sections executable by a machine for causing the machine to perform a set of steps including: setting a priority level of a notification arriving into a queue; inserting the notification into a position in the queue based upon the priority level of the notification, wherein notifications at a queue top have a higher priority than notifications at a queue bottom; selecting a notification at the queue top; and playing a message corresponding to the selected notification to the user.

These and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
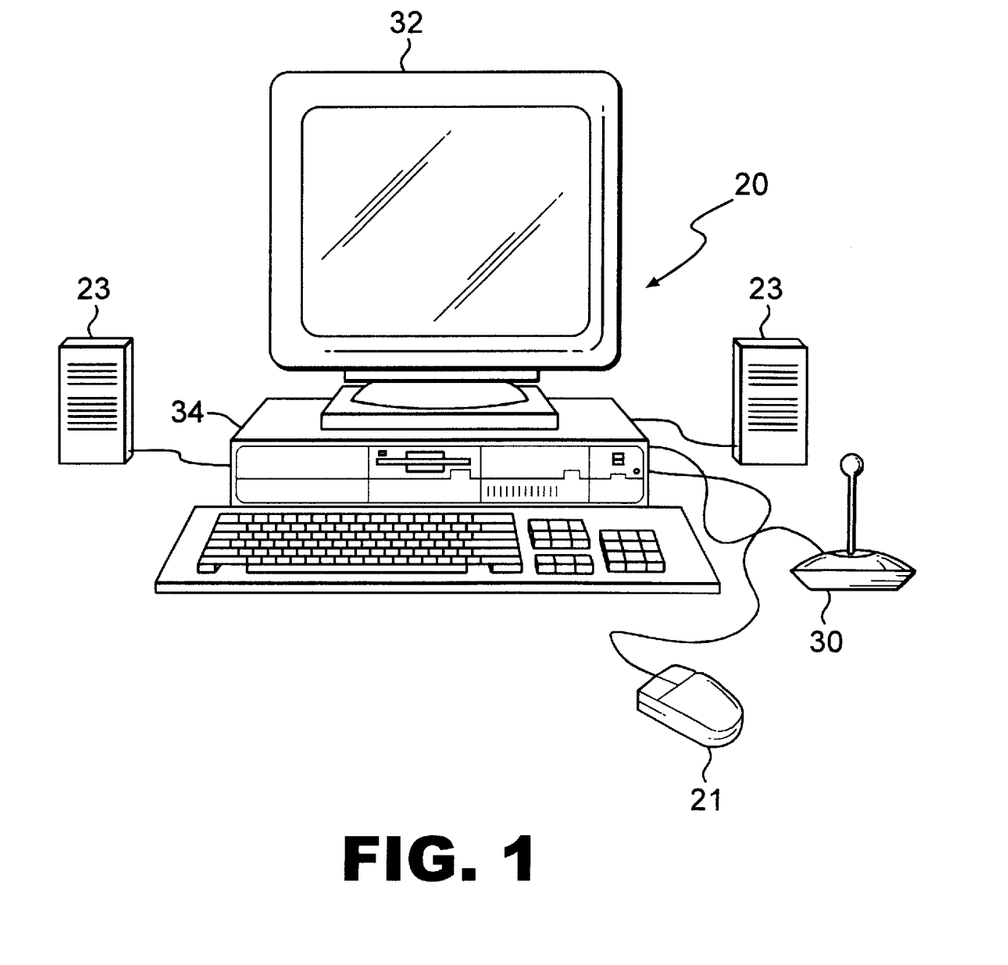
FIG. 1 is a block diagram which illustrates a computer system for speech recognition.

FIG. 1 shows a typical computer system 20 for use in conjunction with the present invention. The system is preferably comprised of a computer 34 including a central processing unit (CPU), one or more memory devices and associated circuitry. The system also includes a microphone 30 and speakers 23 operatively connected to the computer system 20 through a suitable interface circuitry or "sound board" (not shown). Although not required, at least one user interface display unit 32 such as a video data terminal (VDT) can be operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. An interface device, such as mouse 21, may also be provided with the system, but is not necessary for operation of the invention as described herein.

The various hardware requirements for the computer system as described herein can generally be satisfied by any one of many commercially available high speed multimedia personal computers offered by manufacturers such as International Business Machines Corporation (IBM). The computer system can also be satisfied by a specific purpose computer, such as an embedded computer used in an automobile for monitoring and controlling the automobile operation.

Figure 2:
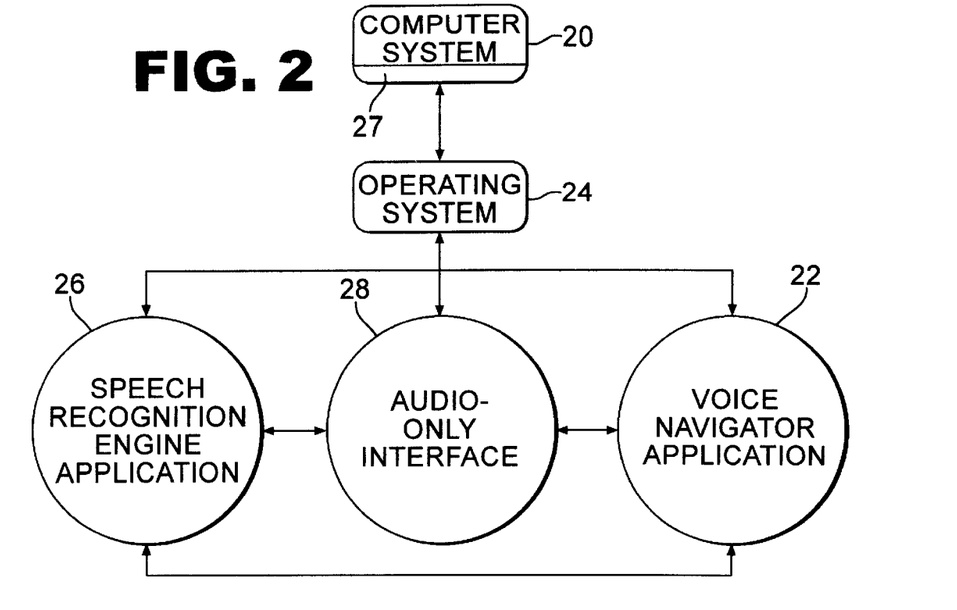
FIG. 2 is a block diagram showing a typical high level architecture for the computer system in FIG. 1.

FIG. 2 illustrates a typical architecture for a system having an audio only interface 28 in computer 20. As shown in FIG. 2, the system typically includes an operating system 24 and a speech recognition engine application 26. A voice navigator application 22 may also be provided. In FIG. 2, the speech recognition engine 26, audio-only interface 28, and the voice navigator 22 are shown as separate application programs. It should be noted however that the invention is not limited in this regard, and these various application could, of course be implemented as a single, more complex application program. Also, if no other speech controlled application programs are to be operated in conjunction with the audio interface and speech recognition engine, then the system may be modified to operate without the voice navigator application.

When a user speaks into the microphone 30, audio signals representative of sound received in the microphone 30 are processed within the computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

The speech recognition engine 26 receives the digitized speech signal from the operating system 24. The signal is subsequently transformed into a useful set of data by sampling the signal at some fixed rate, typically every 10–20 msec. The transformation produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. Algorithms process the speech signals further to adapt speaker-independent acoustic models to those of the current speaker. Search algorithms are used to find the most likely words corresponding to the speech signal. The search occurs with the help of acoustic models, lexical models, and language models.

The voice navigator primarily helps coordinate the operation of the speech recognition engine application. The audio interface includes a notification management system which receives and selects notification of an event, and plays messages corresponding to notifications through the computer speakers 23. The messages may be predefined scripts, text-to-speech, or recorded audio, which corresponds to a notification spawned by a particular event, such as alarm signals from a building control and monitoring system which warns the user of an equipment failure, or original messages, such as e-mail, voice mail, and input by a third person. The notifications are received by the system, and can be in the form of a control signal, a digitized audio signal, such as the corresponding message, and the like, which are generated by a user or other external source.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention may also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Figure 3A:
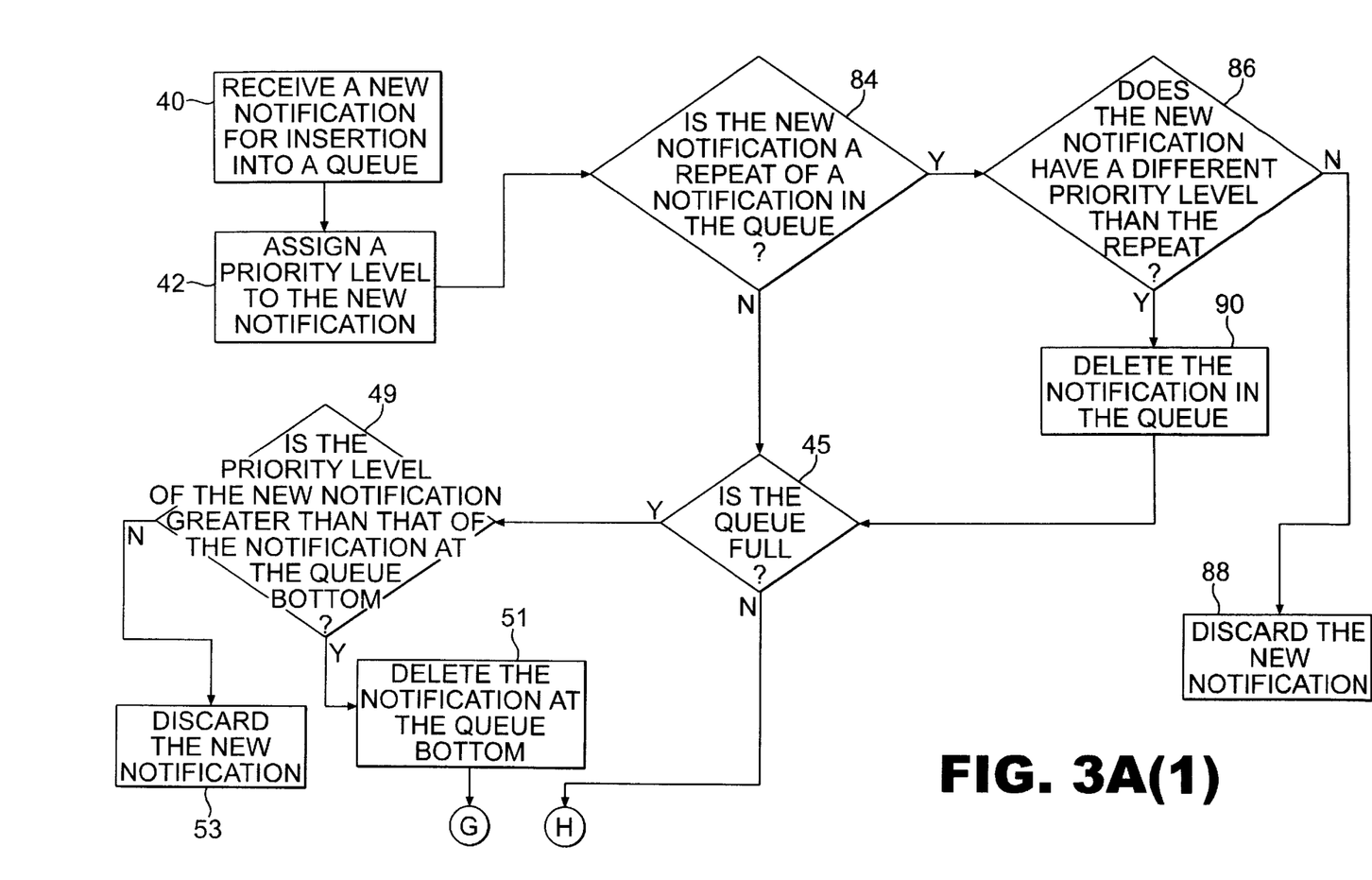
FIGS. 3A–3I show a flow chart illustrating the process according to the present invention.

As shown in FIG. 3A, step 40, notifications are received by the interface 28, and stored in a queue until they are selected by the notification management system. When a notification is received by the audio-only interface 28, the interface 28 assigns it a priority level at step 42. The assigned priority level can be determined by one or more properties of the notification, message, user, or computer system, such as the type of notification, the content of the message, a user profile, a response in reply to a user query, past user behavior, internal system state, and the like.

The following examples illustrate priority assignments which can be used in the practice of the present invention, and do not limit the scope of the invention. In one example, a voice mail left by a user can generate a notification which is received by the interface. A voice recognition application can analyze the voice mail message to determine the identity of the speaker. The notification is then assigned a priority level based upon the speaker's level in the organization (i.e., a notification of a message from the organization president will be assigned a higher priority than a notification of a message from a line manager). In another example, a notification of a general broadcast message for playing via a voice mail system can be assigned a lower priority than a notification of a message directed to an individual voice mail user. Yet another example can be assigning a low priority level to a notification of the type which an individual user routinely declines to play the message corresponding to the notification. Still another example is a notification from a car computer which provides messages containing directions to a driver. A notification of an upcoming direction change can be assigned a higher priority as the vehicle approaches the location of the change. The priority level of the notification can be higher or lower depending upon the weather conditions and alternate routes available if the turn is missed.

Certain notifications can be time or event dependent (i.e., as time passes or subsequent events occur their urgency increases or decreases). For example, in a building monitoring system, a notification indicating a high temperature in a boiler is more urgent when the temperature is 600° F. than when the temperature is 350° F. Therefore, in the present method, the priority level of the notification indicating a high temperature is changed, and the notification position in the queue is altered to reflect the new priority level.

As shown in FIG. 3A, steps 84, 86, 88, and 90, when a new notification repeats a prior notification, the system compares the priority level of the repeat notification with the priority level of a prior notification already in the queue to maintain a queue with current priority levels. A repeat notification is a new notification of the same event which caused issuance of the prior notification being processed by the system. If the new notification does not have a corresponding repeat audio notification in the queue, the new audio notification is inserted into the queue in a position based upon its priority level in step 44.

In steps 84 and 86, if the new notification is a repeat notification, the interface compares the notification priorities. If the repeat notification has a different priority level than the prior notification, the prior notification in the queue is deleted in step 90, and the repeat notification is placed in a position in the queue based upon the newly assigned priority level in step 44. If the repeat notification has the same priority level as the prior notification in the queue in step 86, the repeat notification is discarded in step 88. This has the effect of maintaining the high priority notifications at the top of the queue by reorganizing the queue in response to differing conditions after the notification is initially placed in the queue.

The queue is a sequential list of notifications, wherein the notifications proximal the top of the queue have a higher priority level than notifications proximal the queue bottom. The queue can have a limited capacity, that is, only a specific number of notifications can be on the list at one time. Therefore, in step 45, prior to inserting a notification into the queue in step 44, the interface checks to determine whether the queue is full.

If the queue is full, in step 49 the priority level of the notification which is to be inserted into the queue is compared to the notification at the bottom of the queue. In step 51, if the priority level of the notification at the bottom of the queue is less than the notification which is to be inserted into the queue, the notification at the bottom of the queue is deleted to make room in the queue. In step 44, the notification which is to be inserted into the queue is then inserted into the queue. If the notification which is to be inserted into the queue has a lower priority than the notification at the queue bottom, in step 53 the notification which is to be inserted into the queue is discarded.

When a notification is in the queue, in steps 46 and 47, the notification at the top of the queue is selected by the interface, if its priority level is greater than a gate level. The gate level is a predetermined level which can be dynamic or preset by the user to screen out notifications below a specific priority level. A dynamic gate level changes in response to changing conditions. For example, in an automobile, the dynamic gate level would be low when the user is driving on a clear stretch of highway, and it would rise when weather or traffic conditions cause driving to become more difficult.

As shown in steps 48 and 50, once a notification is selected by the interface the interface notifies the user of a selected notification, and it queries the user as to whether the message corresponding to the selected notification should be played. The user responds to the query by speaking into the microphone 30. Although disclosed herein, notifying and querying the user, as in steps 48 and 50, may not be desired when the message corresponding to the selected notification is short in length. However, if the message exceeds a predetermined time required for playing, such as 10 seconds, steps 48 and 50 may be preferred.

When the user responds to the query, audio signals representative of sound from the user are received in the microphone 30, and processed within the computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3B:
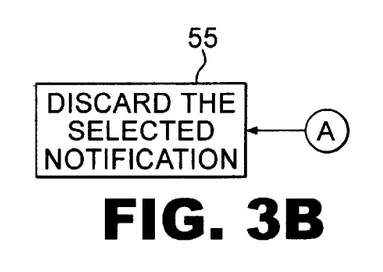
Figure 3C:
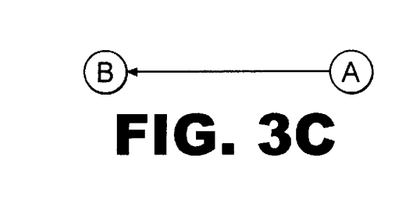
Figure 3D:
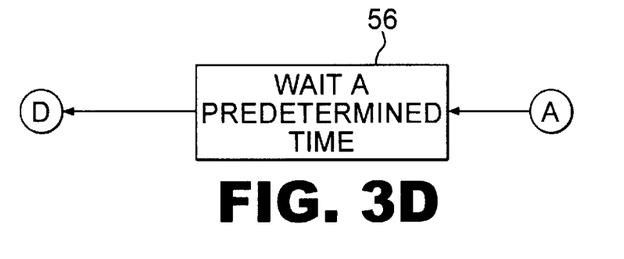
Figure 3E:
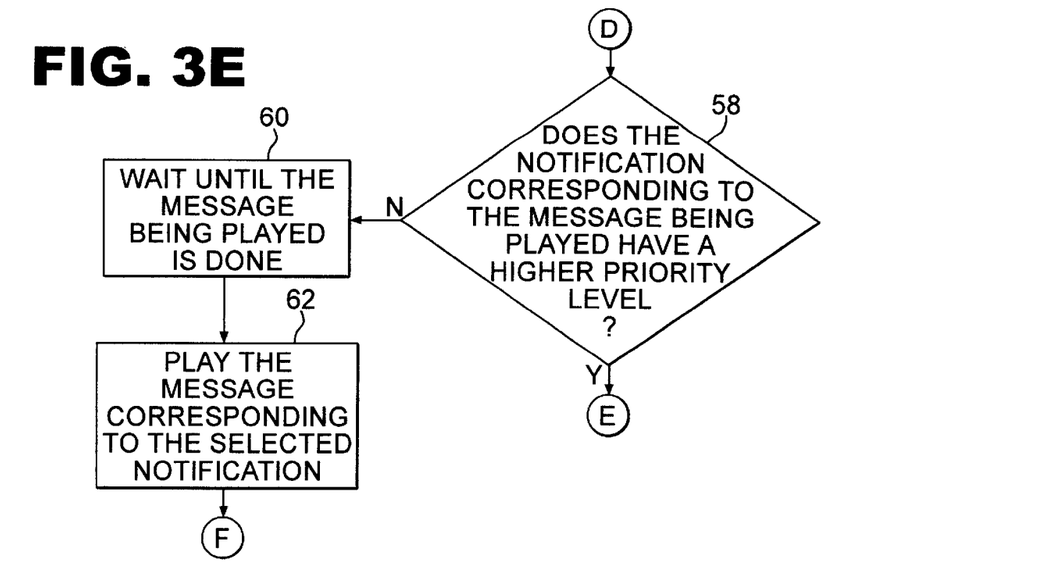

As shown in FIGS. 3B–3D, a negative response to the interface query causes the interface to process the selected notification using one of the following alternatives: the interface can discard the notification as in FIG. 3B, step 55; return the notification to the queue in a position corresponding to its priority level as in FIG. 3C; or hold the notification in storage and query the user after a specified time whether to play the corresponding message as in FIG. 3D, step 56. The alternative chosen for handling a declined notification can be a configurable option specified by the user or selected by the programmer.

Figure 3F:
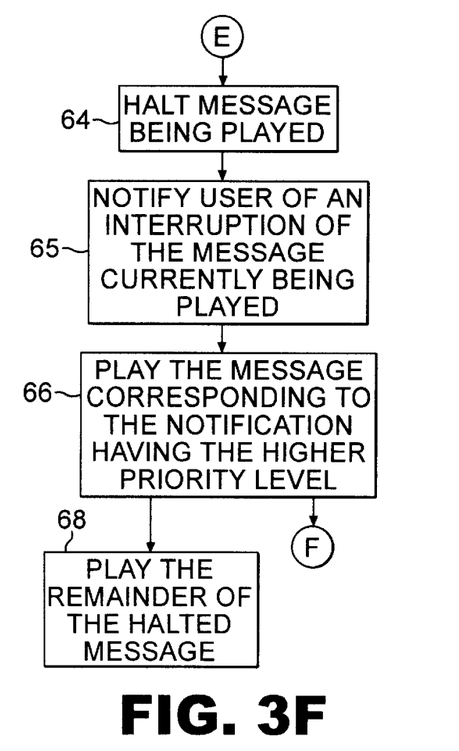
Figure 3G:
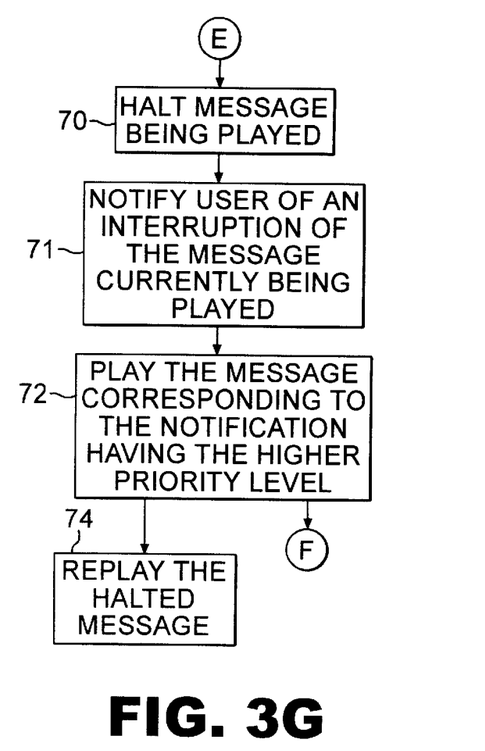

As shown in FIG. 3A, steps 52 and 54, an affirmative answer by the user in response to the interface query in step 50 causes the interface to play the message corresponding to the selected notification through the speakers if a previous notification message is not being played. However, as shown in FIGS. 3A and 3F, steps 52, 64, 65, and 66, if a previously selected notification message has not been completely played by the interface, and has a lower priority level than the currently selected notification, the interface preferably halts the previously selected notification message, notifies the user of an interruption, and plays the currently selected notification message. Upon completion of the higher priority notification message, the remainder of the previously selected notification message is played as in step 68. The previously selected notification message can also be replayed starting from the beginning as in FIG. 3G, steps 70, 71, 72, and 74.

Figure 3H:
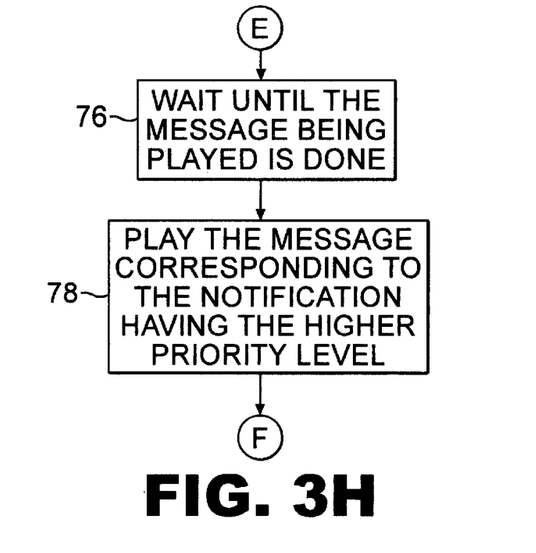
Figure 3I:
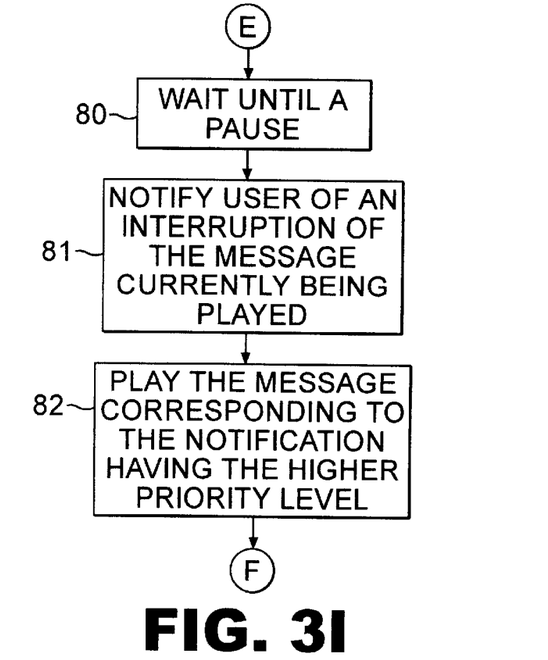

Alternatively, as shown in FIGS. 3H and 3I, the selected notification message is played after the completion of the previously selected notification message as in steps 76 and 78, or when a pause occurs as in steps 80, 81, and 82. A pause can occur during a dialog between the user and the interface. For example, a pause occurs after an anticipated response is received by the interface in response to the previously selected notification query, or after a predetermined time following playing the previously selected notification query upon which a response is anticipated. Of course, the higher priority can also be played over the lower priority notification, preferably at a higher volume. As in the handling of a declined notification, the alternative chosen for handling an accepted notification can be a configurable option specified by the user or selected by the programmer.

Referring to FIGS. 3A, 3E–I, once the message corresponding to the selected notification is played, the selected notification is deleted from the queue in step 57. Once the selected notification is deleted from the queue, the interface loops back to step 46 to select the next notification.

While the foregoing specification illustrates and describes the preferred embodiments of this invention, it is to be understood that the invention is not limited to the precise construction herein disclosed. The invention can be embodied in other specific forms without departing from the spirit or essential attributes. For example, the steps can be combined, additional steps can be inserted, and steps can be substituted from those described herein without departing from the scope of the present invention. Accordingly, reference should be made to the following claims, rather than to the foregoing specification, as indicating the scope of the invention.

What is claimed is:

1. In a computer system having an audio-only interface, a method for playing a message to a user by selecting one of a plurality of notifications comprising the steps of:

setting a priority level of a notification arriving into a queue, as determined by said computer system, wherein if said notification is associated with the receipt of an electronic message, said priority level of said notification is set lower when said electronic message is sent to more than one recipient;

inserting said notification into a position in said queue based upon said priority level of said notification, wherein notifications proximal a top of said queue have a higher priority than notifications proximal a bottom of said queue;

selecting a notification at said queue top; and playing a message corresponding to said selected notification to said user.

2. In a computer system having an audio-only interface, a method for playing a message to a user by selecting one of a plurality of notifications comprising the steps of:

setting a priority level of a notification arriving into a queue, as determined by said computer system, wherein said priority level of said notification is set lower if said notification is a type which a user has previously declined to play;

inserting said notification into a position in said queue based upon said priority level of said notification, wherein notifications proximal a top of said queue have a higher priority than notifications proximal a bottom of said queue;

selecting a notification at said queue top; and playing a message corresponding to said selected notification to said user.

3. In a computer system having an audio-only interface, a method for playing a message to a user by selecting one of a plurality of notifications comprising the steps of:

setting a priority level of a notification arriving into a queue, as determined by said computer system, wherein said priority level of one of said notifications in said queue is increased if said notification has been within said queue for a predetermined amount of time and a message associated with said notification has not been played;

inserting said notification into a position in said queue based upon said priority level of said notification, wherein notifications proximal a top of said queue have a higher priority than notifications proximal a bottom of said queue;

selecting a notification at said queue top; and playing a message corresponding to said selected notification to said user.

4. In a computer system having an audio-only interface adapted for playing a message to a user by selecting one of a plurality of audio notifications comprising:

means for setting a priority level of a notification arriving into a queue, as determined by said computer system, wherein if said notification is associated with the receipt of an electronic message, said means for setting said priority level of said notification set said priority level lower when said electronic message is sent to more than one recipient;

means for inserting said notification into a position in said queue based upon said priority level of said notification, wherein notifications proximal a top of said queue have a higher priority than notifications proximal a bottom of said queue;

means for selecting a notification at said queue top; and means for playing a message corresponding to said selected notification to said user.

5. In a computer system having an audio-only interface adapted for playing a message to a user by selecting one of a plurality of audio notifications comprising:

means for setting a priority level of a notification arriving into a queue, as determined by said computer system, wherein said means for setting said priority level of said notification set said priority level lower if said notification is a type which a user has previously declined to play;

means for inserting said notification into a position in said queue based upon said priority level of said notification, wherein notifications proximal a top of said queue have a higher priority than notifications proximal a bottom of said queue;

means for selecting a notification at said queue top; and means for playing a message corresponding to said selected notification to said user.

6. In a computer system having an audio-only interface adapted for playing a message to a user by selecting one of a plurality of audio notifications comprising:

means for setting a priority level of a notification arriving into a queue, as determined by said computer system, wherein said means for setting a priority level increase said priority level of one of said notifications in said queue if said notification has been within said queue for a predetermined amount of time and a message associated with said notification has not been played;

means for inserting said notification into a position in said queue based upon said priority level of said notification, wherein notifications proximal a top of said queue have a higher priority than notifications proximal a bottom of said queue;

means for selecting a notification at said queue top; and means for playing a message corresponding to said selected notification to said user.

7. A machine readable storage, having stored thereon a computer program having a plurality of code sections executable by a machine for causing the machine to perform the steps of:

setting a priority level of a notification arriving into a queue, as determined by said computer system, wherein if said notification is associated with the receipt of an electronic message, said priority level of said notification is set lower when said electronic message is sent to more than one recipient;

inserting said notification into a position in said queue based upon said priority level of said notification, wherein notifications proximal a top of said queue have a higher priority than notifications proximal a bottom of said queue;

selecting a notification at said queue top; and playing a message corresponding to said selected notification to said user.

8. A machine readable storage, having stored thereon a computer program having a plurality of code sections executable by a machine for causing the machine to perform the steps of:

setting a priority level of a notification arriving into a queue, as determined by said computer system, wherein said priority level of said notification is set lower if said notification is a type which a user has previously declined to play;

inserting said notification into a position in said queue based upon said priority level of said notification, wherein notifications proximal a top of said queue have a higher priority than notifications proximal a bottom of said queue;

selecting a notification at said queue top; and playing a message corresponding to said selected notification to said user.

9. A machine readable storage, having stored thereon a computer program having a plurality of code sections executable by a machine for causing the machine to perform the steps of:

setting a priority level of a notification arriving into a queue, as determined by said computer system, wherein said priority level of one of said notifications in said queue is increased if said notification has been within said queue for a predetermined amount of time and a message associated with said notification has not been played;

inserting said notification into a position in said queue based upon said priority level of said notification, wherein notifications proximal a top of said queue have a higher priority than notifications proximal a bottom of said queue;

selecting a notification at said queue top; and playing a message corresponding to said selected notification to said user.

* * * * *